United States Patent
Mera et al.

(10) Patent No.: US 8,456,054 B2
(45) Date of Patent: Jun. 4, 2013

(54) INTERPHASE INSULATIVE STRUCTURE FOR MOTOR AND METHOD FOR COUPLING INTERPHASE INSULATIVE SHEET IN MOTOR

(75) Inventors: Minoru Mera, Kariya (JP); Kazuto Saga, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 165 days.

(21) Appl. No.: 12/834,407

(22) Filed: Jul. 12, 2010

(65) Prior Publication Data

US 2011/0012475 A1 Jan. 20, 2011

(30) Foreign Application Priority Data

Jul. 14, 2009 (JP) ................................. 2009-165761

(51) Int. Cl.
*H02K 3/34* (2006.01)
(52) U.S. Cl.
USPC .......................................... 310/215; 310/184
(58) Field of Classification Search
USPC ................ 310/180, 184, 185, 198, 207–208, 310/215; 174/138 E
See application file for complete search history.

(56) References Cited

U.S. PATENT DOCUMENTS

| | | | | |
|---|---|---|---|---|
| 4,263,475 A | * | 4/1981 | McNeal | 174/138 E |
| 4,403,162 A | * | 9/1983 | Pallaro | 310/194 |
| 4,588,916 A | * | 5/1986 | Lis | 310/260 |
| 5,093,543 A | * | 3/1992 | Patton et al. | 174/138 E |
| 6,064,131 A | * | 5/2000 | DeHart | 310/198 |
| 6,995,491 B2 | * | 2/2006 | Kimura et al. | 310/215 |
| 7,649,296 B2 | * | 1/2010 | Fukasaku et al. | 310/215 |
| 2006/0250041 A1 | * | 11/2006 | Adaniya et al. | 310/156.53 |
| 2009/0079291 A1 | * | 3/2009 | Horiba et al. | 310/215 |
| 2009/0108696 A1 | | 4/2009 | Horiba et al. | |

FOREIGN PATENT DOCUMENTS

| | | |
|---|---|---|
| CN | 101425714 A | 5/2009 |
| JP | 11-206058 | 7/1999 |
| JP | 2004-364382 A | 12/2004 |
| JP | 2005-080356 A | 3/2005 |
| JP | 2008-141921 | 6/2008 |

OTHER PUBLICATIONS

Machine Translation, JP 2004-364382, Yamaguchi, Dec. 2004.*
Machine Translation of Matsubara et al., JP 2008-141921, Jun. 2008.*
Chinese Office Action, dated Jul. 13, 2012, issued in corresponding Chinese Application No. 201010231332.2.

* cited by examiner

*Primary Examiner* — Burton Mullins
(74) *Attorney, Agent, or Firm* — Sughrue Mion, PLLC

(57) ABSTRACT

An interphase insulative structure for a motor. The motor includes a stator core, a plurality of teeth arranged along an inner circumference of the stator core, and first to third phase windings wave wound to the stator core. The interphase insulative structure includes first interphase insulators and second interphase insulators. The first and second interphase insulators are connected between adjacent coil end conductive portions of the second winding at least at a second end of the stator core.

6 Claims, 7 Drawing Sheets

INTERPHASE INSULATIVE STRUCTURE FOR MOTOR AND METHOD FOR COUPLING INTERPHASE INSULATIVE SHEET IN MOTOR

BACKGROUND OF THE INVENTION

The present invention relates to an interphase insulative structure for a motor and a method for coupling an interphase insulative sheet in a motor.

Japanese Laid-Open Patent Publication No. 2004-364382 describes an interphase insulative sheet (interphase insulative paper), which is arranged between the coil ends of windings for a plurality of phases. The interphase insulative sheet described in Japanese Laid-Open Patent Publication No. 2004-364382 includes a first interphase insulative portion, a second interphase insulative portion, and a coupling portion. The first interphase insulative portion is arranged between the coil end of a U phase winding and the coil end of a V phase winding. The second interphase insulative portion is arranged between the coil end of a V phase winding and the coil end of a W phase winding. The coupling portion couples the first and second interphase insulative portions and is arranged between the coil end of the V phase winding and an end face of a stator core. Further, the coupling portion functions to prevent displacement of the first and second interphase insulative portions.

An inserter, such as that described in Japanese Laid-Open Patent Publication No. 2005-80356, is used to insert the windings into slots and wave-wind the windings onto a stator core. The inserter is inserted into the stator core, which is annular. Upon completion of the insertion of the U phase winding and the V phase winding, an interphase insulative sheet for the V and W phases is coupled to the stator core. However, the interphase insulative sheet between the V and W phases has annular first and second interphase insulative portions that may partially overhang from the annular stator core in a radially inward direction. Such an overhanging part may interfere with the insertion of the inserter into the annular stator core. This may damage the inserter or the interphase insulative sheet.

SUMMARY OF THE INVENTION

It is an object of the present invention to prevent an interphase insulative sheet, which is arranged between the coil end of a second phase winding and the coil end of a third phase winding, from overhanging from an annular stator core in a radially inward direction.

One aspect of the present invention is an interphase insulative structure for a motor. The motor includes an annular stator core having a first end and a second end in an axial direction. A plurality of teeth are arranged along an inner circumference of the stator core. Slots are formed between adjacent ones of the teeth in the circumferential direction. First, second, and third phase windings are extended through the slots and wave wound to the stator core. Each of the phase windings have a plurality of coil end conductive portions, which project outward from the slots at each of the first and second ends of the stator core, and a plurality of slot conductive portions, which are arranged in the slots. The coil end conductive portions and the slot conductive portions are alternately arranged and connected to one another. The coil end conductive portions for each phase form a coil end at each of the first and second ends of the stator core. The interphase insulative structure includes an annular sheet-shaped first interphase insulator arranged at each of the first end and second end of the stator core between the coil ends of the first phase winding and the coil ends of the second phase winding. An annular sheet-shaped second interphase insulator is arranged at each of the first end and second end of the stator core between the coil ends of the second phase winding and the coil ends of the third phase winding. The first interphase insulator and the second interphase insulator are coupled to each other between adjacent ones of the coil end conductive portions of the second phase winding at least at the second end of the stator core.

A further aspect of the present invention is a method for coupling interphase insulative sheets in a motor. The motor includes an annular stator core. A plurality of teeth are arranged along an inner circumference of the stator core. Slots are formed between adjacent ones of the teeth in the circumferential direction. First, second, and third phase windings are inserted into the slots from a first end and wave wound to the stator core. Each of the phase windings have a plurality of slot conductive portions, which are arranged in the slots, and a plurality of coil end conductive portions, which project outward from the slots. The coil end conductive portions and the slot conductive portions are alternately arranged and connected to one another. The coil end conductive portions for each phase form a first coil end at the first end of the slots. Further, the coil end conductive portions for each phase form a second coil end at a second end of the slots opposite to the first end. The interphase insulative sheets include a first interphase insulative sheet including two annular sheet-shaped first interphase insulators, which are arranged between the first coil ends of different phases and the second coil ends of different phases, and a bridge, which connects the two first interphase insulators. A second interphase insulative sheet includes two annular sheet-shaped second interphase insulators, which are arranged between the first coil ends of different phases and the second coil ends of different phases, and a bridge, which connects the two first interphase insulators. The first interphase insulative sheet is arranged between the first phase winding and the second phase winding. The second interphase insulative sheet is arranged between the second phase winding and the third phase winding. The method includes inserting the first phase winding into the slots and then inserting the bridge of the first interphase insulative sheet into the slots for insertion of the second phase winding, inserting the second phase winding into the slots and then inserting the bridge of the second interphase insulative sheet into the slots for insertion of the third phase winding, interposing the first interphase insulator and the second interphase insulator with an ultrasonic welding base and an ultrasonic horn between adjacent ones of the second coil end conductive portions of the first phase winding and the adjacent ones of the second coil end conductive portions of the second interphase insulator in the circumferential direction of the stator core, and ultrasonically welding the first interphase insulator and the second interphase insulator in the interposed state.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An electric compressor according to one embodiment of the present invention will now be discussed with reference to FIGS. 1A to FIG. 7C.

Figure 1A:
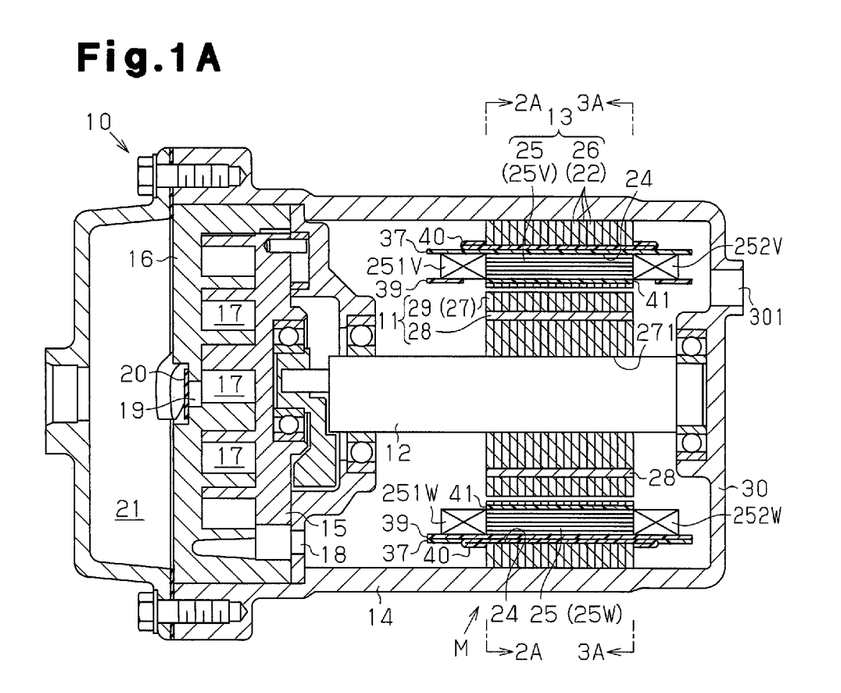
FIG. 1A is a cross-sectional view showing an electric compressor according to one embodiment of the present invention.

In FIG. 1A, the left side defines the front side, and the right side defines the rear side. The electric compressor 10 shown in FIG. 1A is a scroll type electric compressor and includes a motor M. The motor M includes a rotor 11, a rotary shaft 12, a stator 13, and a motor housing 14. The rotor 11 is fixed to the rotary shaft 12. The stator 13 is fitted and fixed to the inner surface of the motor housing 14. The electric compressor 10 includes a movable scroll 15, which serves as a compression body. The movable scroll 15 orbits when the rotary shaft 12 rotates. The orbiting of the movable scroll 15 decreases the volume of a compression chamber 17 defined between the movable scroll 15 and the fixed scroll 16.

The motor housing 14 includes an end wall 30, which has an inlet port 301. The inlet port 301 is connected to an external refrigerant circuit (not shown). Refrigerant (gas) from the external refrigerant circuit enters the housing 14 through the inlet port 301. The orbiting (suction operation) of the movable scroll 15 draws the refrigerant, which has entered the motor housing 14, into a passage 141 (refer to FIGS. 2A and 3A) extending between the inner surface of the motor housing 14 and the outer surface of the stator 13. The refrigerant is further drawn into the compression chamber 17 between the movable scroll 15 and the fixed scroll 16. The refrigerant in the compression chamber 17 is then compressed by the orbiting (suction operation) of the movable scroll 15 and forced out of a discharge port 19 through a discharge valve 20 and discharged into a discharge chamber 21. The refrigerant then flows out of the discharge chamber 21 into the external refrigerant circuit, which returns the refrigerant to the motor housing 14.

Figure 2A:
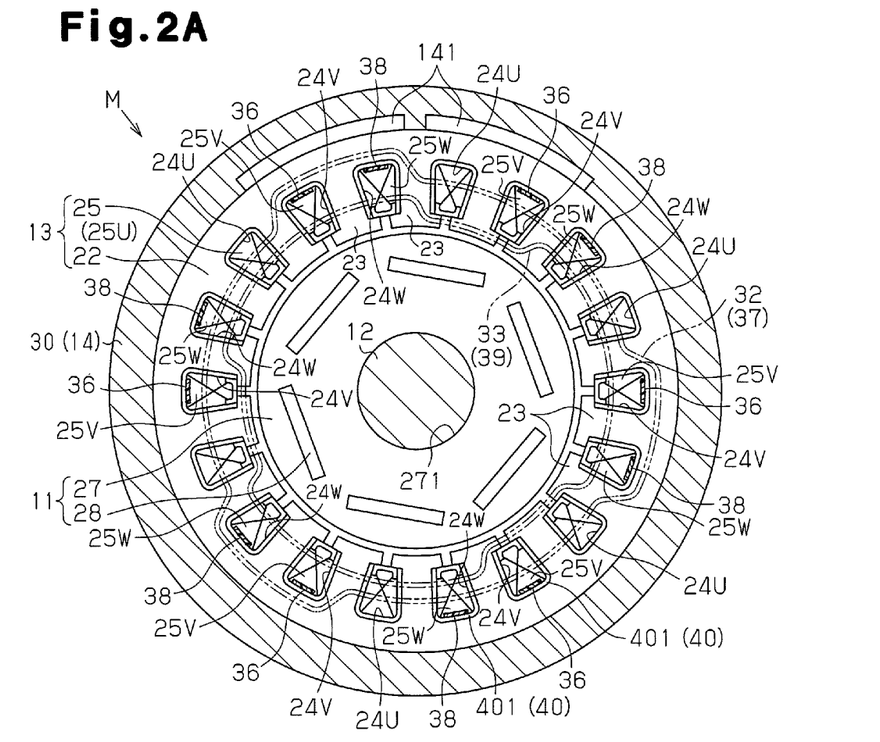
FIG. 2A is a cross-sectional view taken along line 2A-2A in FIG. 1A.
Figure 3A:
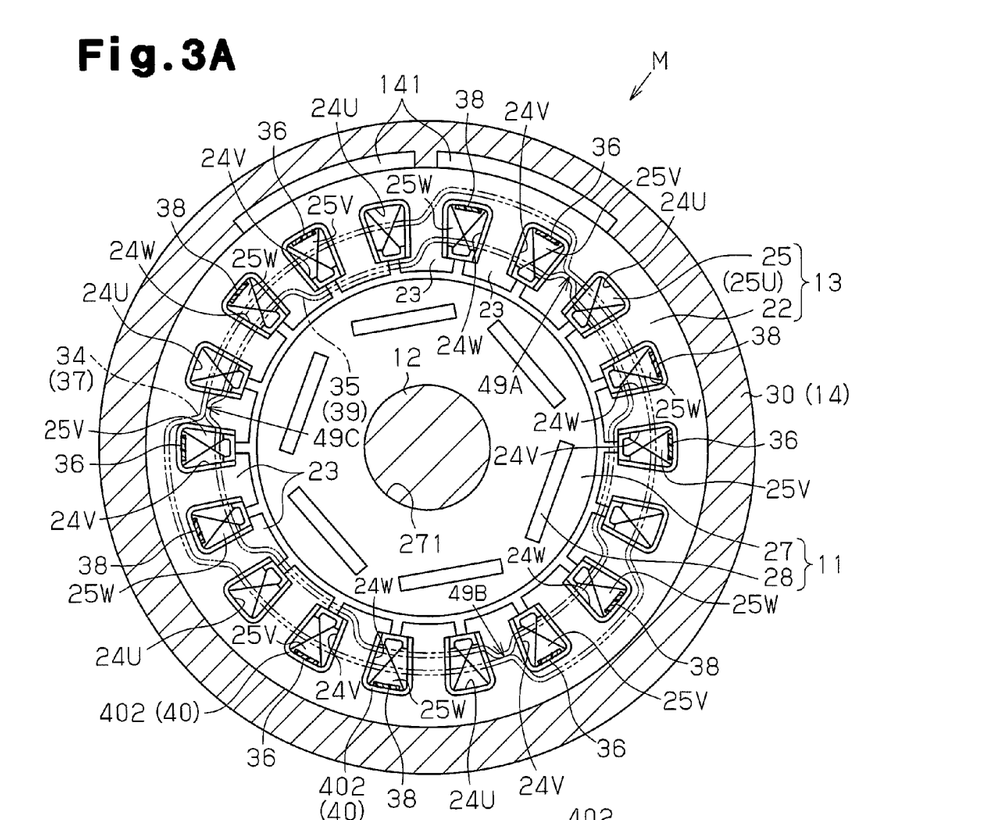
FIG. 3A is a cross-sectional view taken along line 3A-3a in FIG. 1A.

Referring to FIGS. 2A and 3A, the stator 13 includes an annular stator core 22, a plurality of teeth 23, and windings 25. The teeth 23 are arranged along the inner circumference of the stator core 22. The windings 25 extend through slots 24U, 24V, and 24W that are formed between the teeth 23. In the present embodiment, there are eighteen teeth 23 and eighteen slots 24U, 24V, and 24W. The slots 24U, 24V, and 24W are arranged at equal intervals in the circumferential direction of the annular stator 13. Hereafter, the slots 24U, 24V, and 24W may also be simply referred to as the slots 24 (refer to FIG. 1A).

Referring to FIG. 1A, the stator core 22 is formed by stacking a plurality of core plates 26, which are magnetic bodies (electromagnetic steel plates). The rotor 11 includes a rotor core 27 and a plurality of permanent magnets 28, which are embedded in the rotor core 27. The rotor core 27 is formed by stacking a plurality of core plates 29, which are magnetic bodies (electromagnetic steel plates). A shaft bore 271 extends through the center of the rotor core 27. The rotary shaft 12 is fixed in the shaft bore 271.

Figure 2B:
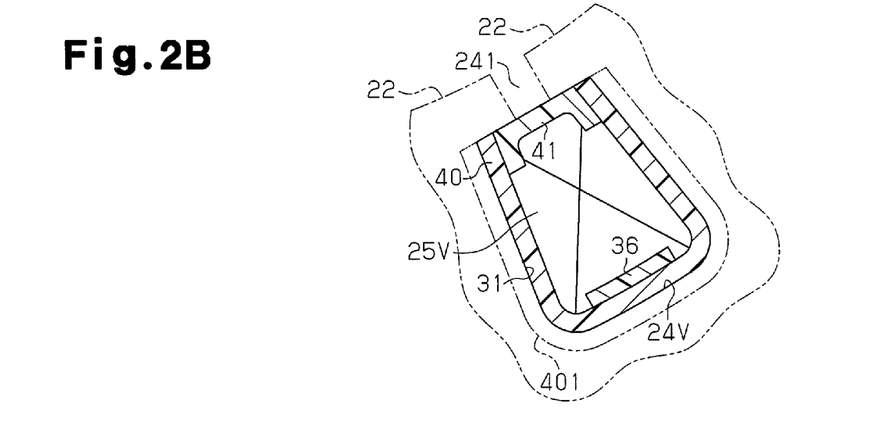
FIG. 2B is a partially enlarged cross-sectional view of FIG. 2A.

Referring to FIG. 2B, a first slot insulative sheet 40, which is formed from a synthetic resin, is arranged between an inner wall surface 31 forming each slot 24V and a winding 25V arranged in the slot 24V. The first slot insulative sheet 40 is curved and U-shaped so as to extend along the inner wall surface 31. Further, a second slot insulative sheet 41, which is formed from a synthetic resin, is arranged between the first slot insulative sheet 40 and the winding 25V at a mouth 241 of the slot 24V so as to cover the mouth 241.

Figure 3B:
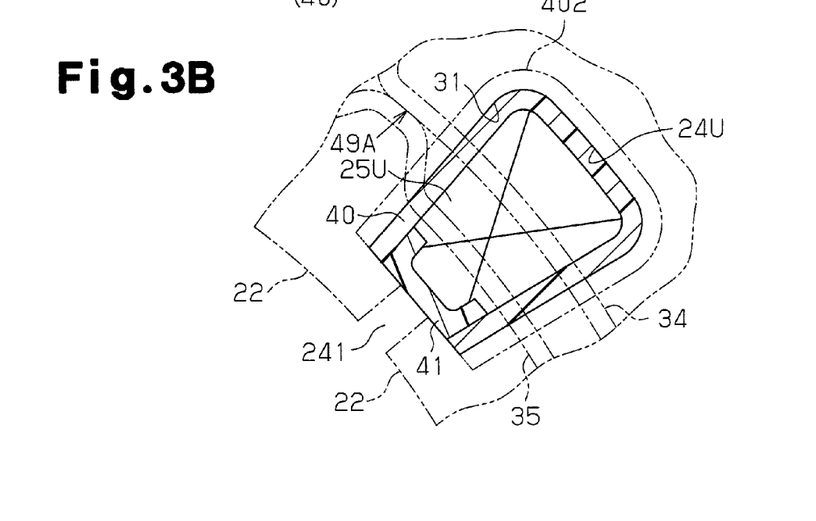
FIG. 3B is a partially enlarged cross-sectional view of FIG. 3A.

Referring to FIG. 3B, a first slot insulative sheet 40, which is formed from a synthetic resin, is arranged between an inner wall surface 31 forming each slot 24U and a winding 25U arranged in the slot 24U. Further, a second slot insulative sheet 41, which is formed from a synthetic resin, is arranged between the first slot insulative sheet 40 and the winding 25U at a mouth 241 of the slot 24U so as to cover the mouth 241.

As shown in FIGS. 2A and 3A, the first and second slot insulative sheets 40 and 41 are also arranged in each of the remaining slots 24W. The first and second slot insulative sheets 40 and 41 space the windings 25 in the slots 24U, 24V, and 24W from the inner wall surface 31 of the slots 24U, 24V, and 24W.

Figure 4:
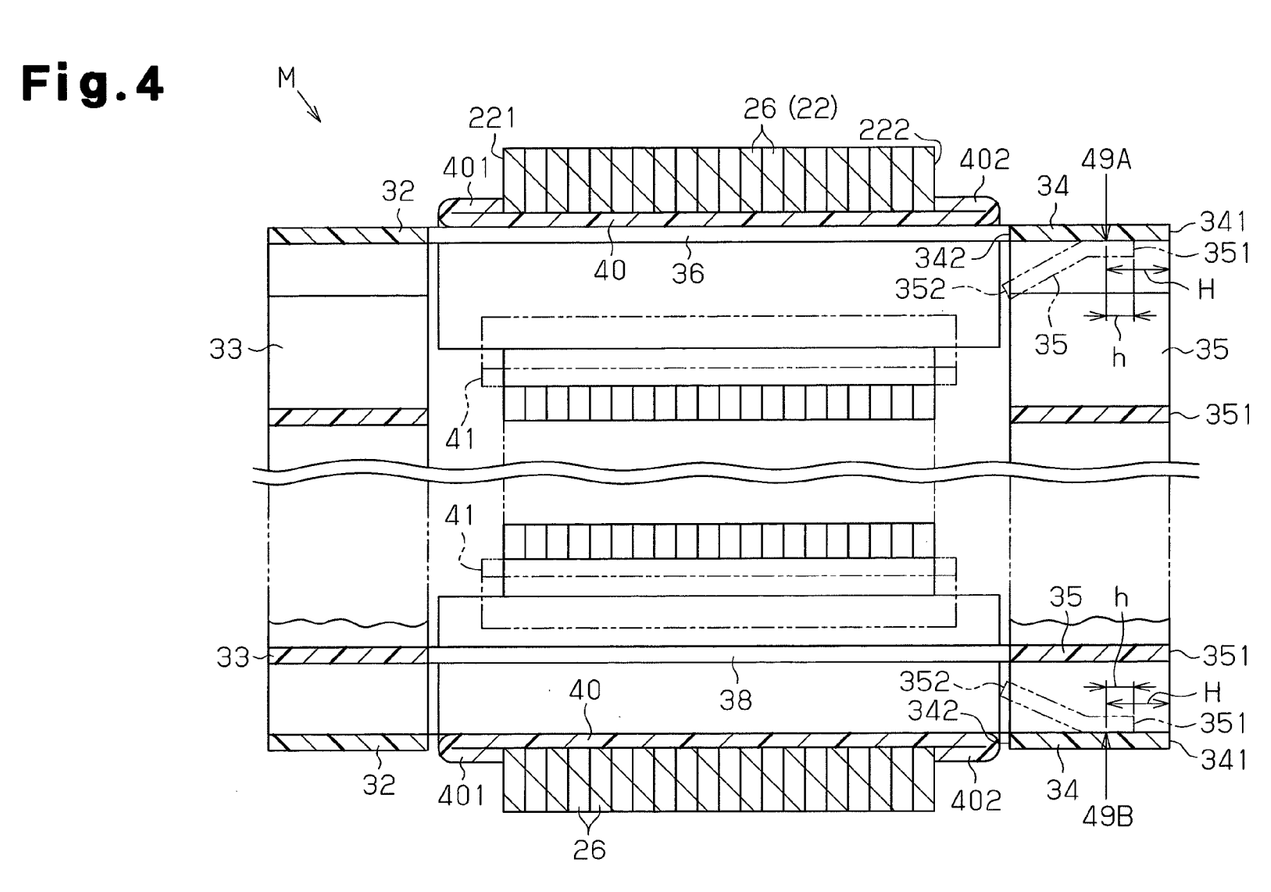
FIG. 4 is a schematic cross-sectional view showing part of a motor of FIG. 1.

In FIG. 4, which shows the motor M, the left side is the front side, and the right side is the rear side. The first slot insulative sheet 40 includes a first end portion 401, which is located at the front side, and a second end portion 402, which is located at the rear side. The stator core 22 has a center axis 220 (refer to FIGS. 5A and 5B) and includes a first end face 221 and a second end face 222. The first end face 221 is located at a first axial end of the stator core 22, and the second end face 222 is located at a second axial end of the stator core 22. As shown in FIG. 4, the first end portion 401 is folded back toward the first end face 221, and the second end portion 402 is folded back toward the second end face 222. The first end portion 401 has a distal end that contacts the first end face 221. The second end portion 402 has a distal end that contacts the second end face 222. The first end portion 401 and second end portion 402 of the first slot insulative sheet 40 located outside the corresponding slot 24 are also respectively referred to as folded portions 401 and 402. The folded portions 401 and 402 are bent to be U-shaped. The folded portions 401 and 402 prevent separation of the first slot insulative sheet from the corresponding one of the slots 24U, 24V, and 24W. Windings are not shown in FIG. 4.

Figure 5A:
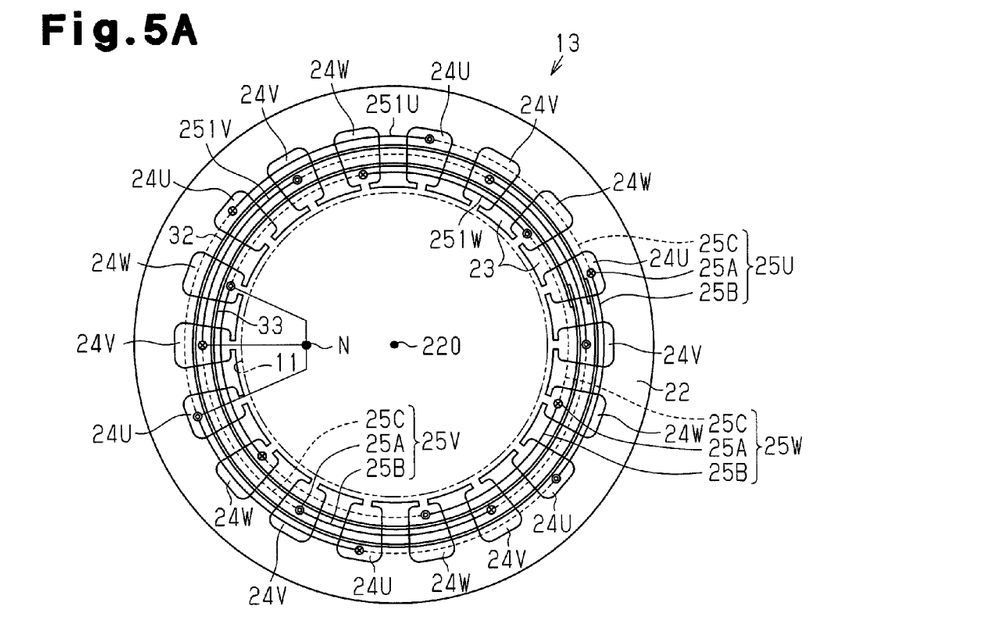
FIGS. 5A and 5B are schematic diagrams showing a wave winding.

FIG. 5A is a schematic front view of the stator 13. The windings 25 extending through the slots 24U, 24V, and 24W are wave windings.

The winding 25U (hereinafter referred to as a U phase winding 25U), which serves as a first phase winding, is inserted into the slots 24U. The winding 25V (hereinafter referred to as V phase winding 25V), which serves as a second phase winding, is inserted into the slots 24V. The winding 25W (hereinafter referred to as a W phase winding 25W), which serves as a third phase winding, is inserted into the slots 24W. The windings 25U, 25V, and 25W each include slot conductive portions, which are arranged in the corresponding slots 24U, 24V, and 24W, and coil end conductive portions, which are arranged outside the corresponding slots 24U, 24V, and 24W. The slot conductive portions and coil end conductive portions are connected alternately to one another. In FIG. 5A, first coil end conductive portions 25B of the phase windings 25U, 25V, and 25W that project out of the first end face 221 are shown by solid lines. The first coil end conductive portions 25B define first coil ends 251U, 251V, and 251W of the corresponding phases. Second coil end conductive portions 25C of the phase windings 25U, 25V, and 25W that project out of the second end face 222 are shown by broken lines. The second coil end conductive portions 25C define second coil ends 252U, 252V, and 252W of the corresponding phases. The portions connecting the first and second coil end conductive portions 25B and 25C define slot conductive portions 25A, which extend through the corresponding slots 24U, 24V, and 24W.

An annular sheet-shaped first interphase insulator 32 encircles the rotor 11 between the first coil ends 251U of the U phase winding 25U and the first coil ends 251V of the V phase winding 25V. An annular sheet-shaped second interphase insulator 33 encircles the rotor 11 between the first coil ends 251V of the V phase winding 25V and the first coil ends 251W of the W phase winding 25W. The first and second interphase insulators 32 and 33 are each formed to be annular by thermally welding the two ends of a strip of a synthetic resin sheet.

In FIG. 5A, N denotes a neutral point at which terminal ends of the phase windings 25W, 25V, and 25W are connected. The neutral point N is located at the first axial end of the stator core 22.

Figure 5B:
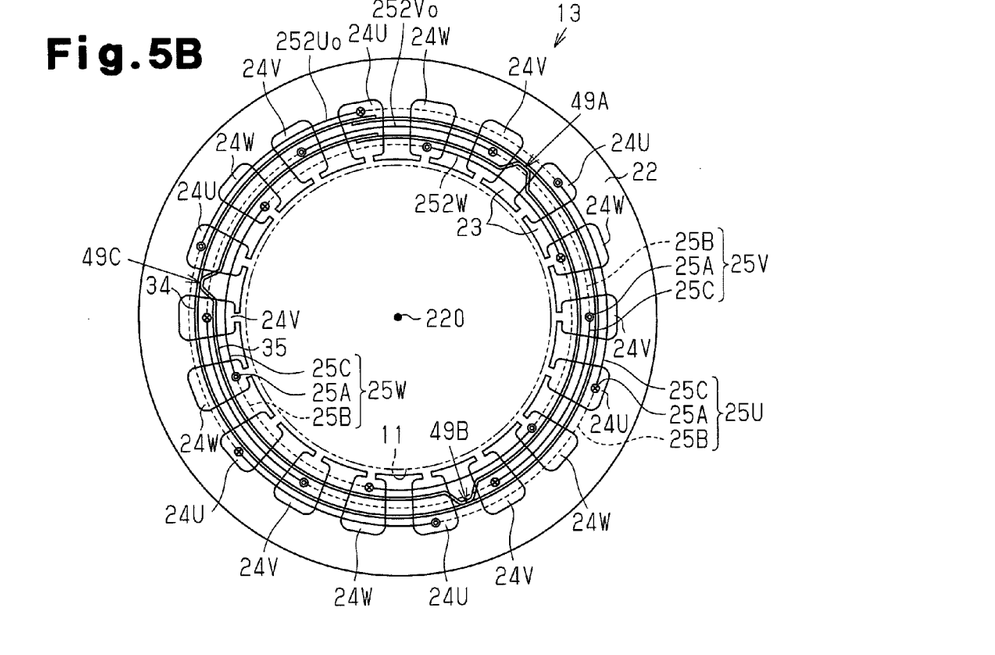

FIG. 5B is a schematic rear view of the stator 13. In FIG. 5B, the second coil end conductive portions 25C of the phase windings 25U, 25V, and 25W that project out of the second end face 222 are shown by solid lines. The first coil end conductive portions 25B of the phase windings 25U, 25V, and 25W that project out of the first end face 221 are shown by broken lines.

An annular sheet-shaped first interphase insulator 34 encircles the rotor 11 between the second coil ends 252U of the U phase winding 25U and the second coil ends 252V of the V phase winding 25V. An annular sheet-shaped second interphase insulator 35 encircles the rotor 11 between the second coil ends 252V of the V phase winding 25V and the second coil ends 252W of the W phase winding 25W. The first interphase insulator 34 is located outward from the second interphase insulator 35, and the inner second interphase insulator 35 is encircled by the outer first interphase insulator 34. The first and second interphase insulators 34 and 35 are each formed to be annular by thermally welding the two ends of a strip of a synthetic resin sheet.

Figure 1B:
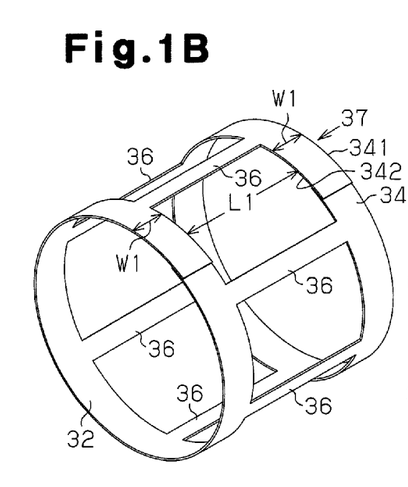
FIGS. 1B and 1C are perspective views showing an interphase insulative sheet.

Referring to FIG. 1B, the first interphase insulators 32 and 34 are connected by a plurality of bridges 36 (six in the present embodiment). The first interphase insulators 32 and 34 are formed integrally with the bridges 36. Referring to FIGS. 2A and 3A, the bridges 36 are inserted into the slots 24V for the V phase windings 25V. The first interphase insulators 32 and 34 and the bridges 36 form a first interphase insulative sheet 37, which insulates the coil ends of the winding 25 for each phase from those of the other phases.

Figure 1C:
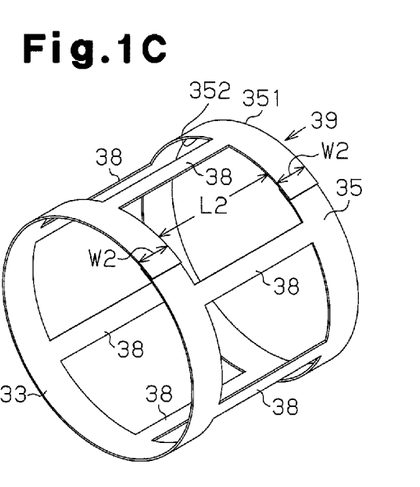

As shown in FIG. 1C, the second interphase insulators 33 and 35 are connected by a plurality of bridges 38 (six in the present embodiment). The second interphase insulators 33 and 35 are formed integrally with the bridges 38. Referring to FIGS. 2A and 3A, the bridges 38 are inserted into the slots 24W for the W phase windings 25W. The second interphase insulators 33 and 35 and the bridges 38 form a second interphase insulative sheet 39, which insulates the coil ends of the winding 25 for each phase from those of the other phases.

The circumferential lengths of the first interphase insulators 32 and 34 in the first interphase insulative sheet 37 are greater than the circumferential lengths of the second interphase insulators 33 and 35 in the second interphase insulative sheet 39. The bridges 36 of the first interphase insulative sheet 37 each have a length L1, and the bridges 38 of the second interphase insulative sheet 39 each have a length L2, which is the same as the length L1. Further, the first and second interphase insulators 32 and 34 of the first interphase insulative sheet 37 each have a width W1, and the first and second interphase insulators 33 and 35 of the second interphase insulative sheet 39 each have a width W2, which is the same as the width W1.

Referring to FIG. 5B, the first interphase insulator 34 of the first interphase insulative sheet 37 and the second interphase insulator 35 of the second interphase insulative sheet 39 are coupled to each other between adjacent coil ends 252V of the V phase winding 25V at the second axial end of the stator core 22. In detail, the first interphase insulator 34 of the first interphase insulative sheet 37 and the second interphase insulator 35 of the second interphase insulative sheet 39 are thermally welded to each other at regions (in the present embodiment, three regions 49A, 49B, and 49C) corresponding to the middle of each second coil end conductive portion 25C in the W phase winding 25W with respect to the circumferential direction of the stator core 22. In the circumferential direction of the stator core 22, the U phase winding 25U and the V phase winding 25V are not arranged at the thermally welded regions 49A, 49B, and 49C. In the axial direction of the stator core 22, the coil end conductive portions of the U phase winding 25U and the V phase winding 25V at the thermally welded regions 49A, 49B, and 49C are each located at the first axial end of the stator core 22.

Figure 6A:
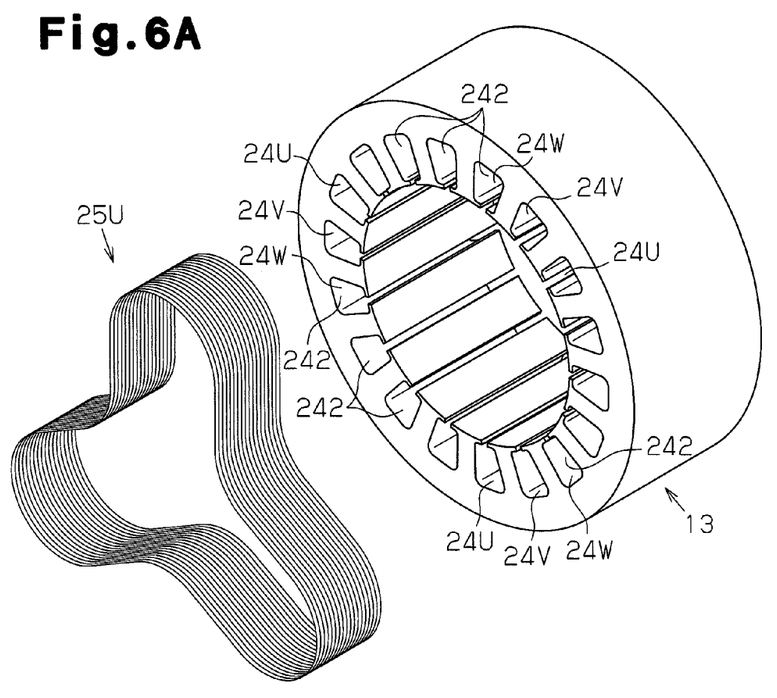
FIGS. 6A and 6B are perspective views showing procedures for inserting a winding into a slot.
Figure 6B:
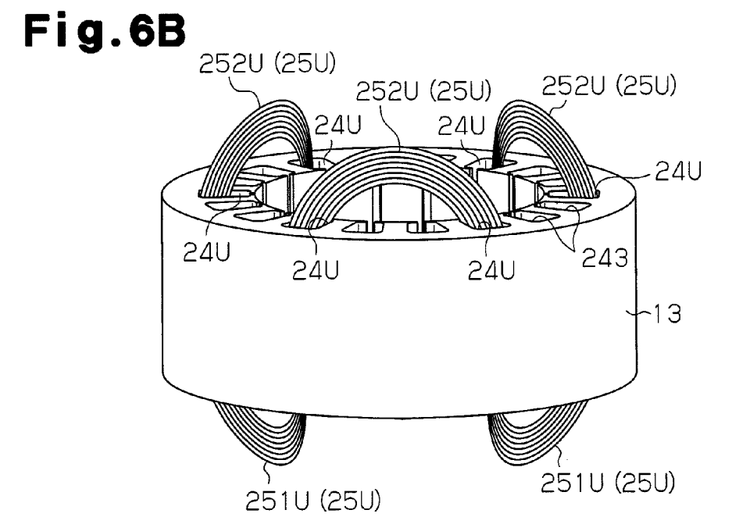

Referring to FIGS. 6A and 6B, an inserter (not shown) is used to insert a winding (in the illustrated example, the U phase winding 25U) into the slot. In the present embodiment, the U phase winding 25U is inserted into each slot 24U from a first end, namely, an insertion end 242), as shown in FIG. 6A. FIG. 6B shows the U phase winding 25U in a state inserted into the slots 24U. The insertion end 242 of each slot 24U is located at the first axial end of the stator core 22.

The first phase winding, or the U phase winding 25U, is inserted into the slots 24U. Then, the bridges 36 of the first interphase insulative sheet 37 are inserted into the slots 24V. Afterwards, the V phase winding 25V is inserted into the slots 24V from the insertion end 242 with the inserter. After insertion of the second phase winding, or the V phase winding 25V, into the slots 24V, the bridges 38 of the second interphase insulative sheet 39 are inserted into the slots 24W. Then, the first interphase insulator 34 of the first interphase insulative sheet 37 and the second interphase insulator 35 of the second interphase insulative sheet 39 are thermally welded to the third phase winding, or the W phase winding 25W, at regions corresponding to the second coil ends 252W. That is, the first interphase insulator 34 of the first interphase insulative sheet 37 and the second interphase insulator 35 of the second interphase insulative sheet 39 are coupled to each other at between a second coil end conductive portion 25C of the first phase winding (U phase winding 25U) and a second coil end conductive portion 25C of the second phase winding (V phase winding 25V), which is adjacent to and does not overlap second coil end conductive portion 25C in the circumferential direction.

FIG. 5B shows second coil ends 252Uo and 252Vo, which are examples of adjacent second coil ends. The three thermally welded regions 49A, 49B, and 49C are hereinafter referred to as the coupling regions 49A, 49B, and 49C.

In FIG. 4, the second interphase insulator 35 indicated by dashed lines is in a state in which it is coupled to the first interphase insulator 34. In the axial direction of the stator core 22, the distance H between an outer edge 341 of the first interphase insulator 34 (the edge that is farther from the end face 222 of the stator core 22) and the coupling regions 49A, 49B, and 49C of the first interphase insulator 34 is greater than the distance h between an outer edge 351 of the second interphase insulator 35 (the edge that is farther from the end face 222 of the stator core 22) and the coupling regions 49A, 49B, and 49C of the second interphase insulator 35. That is, in the axial direction of the stator core 22, the first distance between an inner edge 342 of the first interphase insulator 34 (the edge that is closer to the end face 222 of the stator core 22) and the coupling regions 49A, 49B, and 49C is less than the second distance between an inner edge 352 of the second interphase insulator 35 (the edge that is closer to the end face 222 of the stator core 22) and the coupling regions 49A, 49B, and 49C.

After the first interphase insulator 34 and the second interphase insulator 35 are thermally welded to each other, the W phase winding 25W is inserted into the slots 24W from the insertion end 242 with the inserter.

Figure 7A:
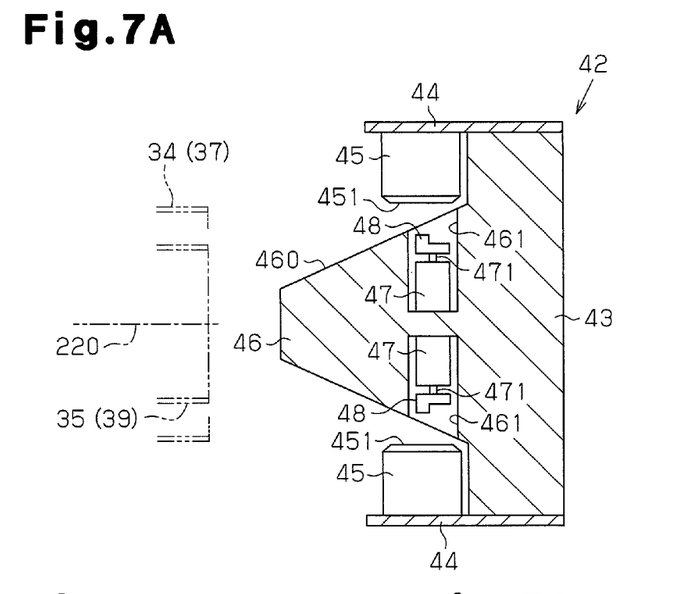
FIGS. 7A to 7C are cross-sectional diagrams showing procedures for coupling a first interphase insulator and a second interphase insulator.
Figure 7B:
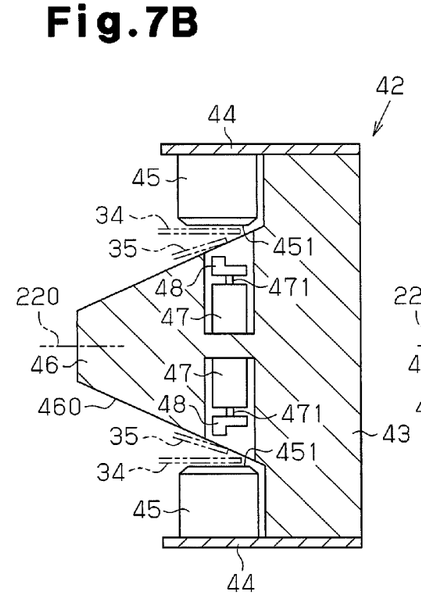
Figure 7C:
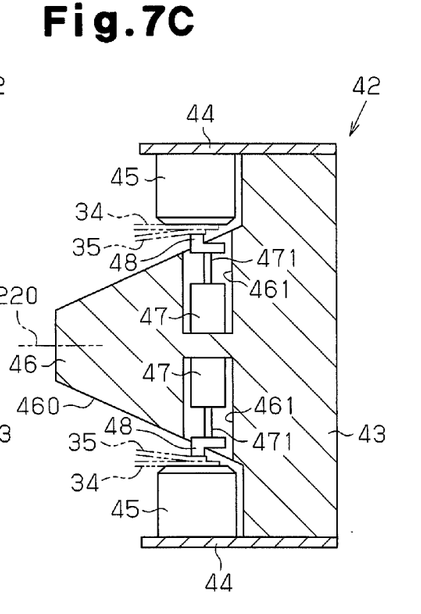

FIGS. 7A to 7C show a thermal welding device 42, which thermally welds the first interphase insulator 34 and the second interphase insulator 35. The thermal welding device 42 includes a base 43, a plurality of (three in the present embodiment, only two are shown in the drawing) support plates 44, and ultrasonic horns 45. The base 43 is reciprocated by a linear actuator (not shown), such as a fluid pressure cylinder). The support plates 44 are fixed around the base 43. The ultrasonic horns 45 are supported by the support plates 44. An expansion portion 46, which has the shape of a truncated cone, projects from an end face of the base 43. The ultrasonic horns 45 face toward a peripheral surface of the expansion portion 46. A plurality of (three in the present embodiment, only two are shown in the drawing) accommodation recesses 461 are formed in the peripheral surface 460 of the expansion portion 46 facing toward the ultrasonic horns 45. A fluid pressure cylinder 47 is secured to the bottom of each accommodation recess 461. The fluid pressure cylinder 47 has an output rod 471. A steel ultrasonic welding chip 48 is fixed to the output rod 471. The ultrasonic welding chip 48 is movable toward and away from a distal surface 451 of the corresponding ultrasonic horn 45.

The thermal welding of the first interphase insulator 34 and the second interphase insulator 35 will now be discussed.

FIG. 7A shows a state in which the bridges 36 of the first interphase insulative sheet 37 are inserted into the slots 24V and the bridges 38 of the second interphase insulative sheet 39 are inserted into the slots 24W. The thermal welding device 42 is located at a standby position in this state.

After the bridges 38 of the second interphase insulative sheet 39 are inserted into the slots 24W, the linear actuator moves the thermal welding device 42 from the standby position shown in FIG. 7A to a welding position as shown in FIG. 7B. The movement of the truncated conical expansion portion 46 expands the annular second interphase insulator 35 of the second interphase insulative sheet 39 outward in the radial direction of the stator core 22 (stator 13). Here, in the second interphase insulator 35, the outer edge 351 is moved more than the inner edge 352 in the radially outward direction. This deforms the second interphase insulator 35 so that it expands out from the inner edge 352 toward the outer edge 351. That is, a cross-section of the second interphase insulator 35 taken along a hypothetical plane including the center axis 220 of the stator core 22 is inclined relative to the center axis 220. Thus, the distance from the end face 222 of the stator core 22 to the outer edge 351 of the second interphase insulator 35 is less than the distance from the end face 222 of the stator core 22 to the outer edge 341 of the first interphase insulator 34.

After the thermal welding device 42 is arranged at the welding position as shown in the state of FIG. 7B, the output rod 471 of each fluid pressure cylinder 47 is projected from the retracted position shown in FIG. 7B. As a result, the first interphase insulator 34 of the first interphase insulative sheet 37 and the second interphase insulator 35 of the second interphase insulative sheet 39 are held between the distal surfaces 451 of the ultrasonic horns 45 and the ultrasonic welding chips 48 at locations between the adjacent second coil ends 252U and the adjacent second coil ends 252V in the circumferential direction of the stator 13.

An ultrasonic device is then activated to generate ultrasonic waves that thermally weld the regions of the first and second interphase insulators 34 and 35 held between the distal surfaces 451 of the ultrasonic horns 45 and the ultrasonic welding chips 48. The distance from the end face 222 of the stator core 22 to the outer edge 351 of the second interphase insulator 35 is less than the distance from the end face 222 of the stator core 22 to the outer edge 341 of the first interphase insulator 34. Thus, the distance H between the outer edge 341 of the first interphase insulator 34 and the coupling regions 49A, 49B, and 49C of the first interphase insulator 34 is greater than the distance h between the outer edge 351 of the second interphase insulator 35 and the coupling regions 49A, 49B, and 49C of the second interphase insulator 35.

After the thermal welding is completed, the output rod 471 of the fluid pressure cylinder 47 is returned to the standby position. Further, the thermal welding device 42 is returned to the standby position shown in FIG. 7A.

Then, the W phase winding 25W is inserted into the slots 24W with the inserter.

The present invention has the advantages described below.

(1) The first interphase insulator 34, which is arranged between the second coil ends 252U of the first phase winding (U phase winding 25U) and the second coil ends 252V of the second phase winding (V phase winding 25V) restricts movement of the stator core 22 in the radial direction. Further, the insertion of the second phase winding (V phase winding 25V) expands the first interphase insulator 34 in the radially outward direction of the stator core 22. Thus, the second interphase insulator 35, which is coupled to the first interphase insulator 34 between the adjacent second coil ends 252Uo and adjacent second coil ends 252Vo in the circumferential direction of the stator do not overhang inward in the radial direction of the stator core 22 (stator 13). Accordingly, the inserter does not get caught by the second interphase insulator 35 when inserting the W phase winding 25W into the slots 24W.

(2) The second interphase insulator 35 is coupled to the first interphase insulator 34 at the coupling regions 49A, 49B, and 49C in a deformed state in which the second interphase insulator 35 is expanded from the inner edge 352 to the outer edge 351. Thus, the second interphase insulator 35, which has a shorter circumferential length than the first interphase insulator 34, receives tensile force acting outward in the radial direction of the stator core 22 at the coupling regions 49A, 49B, and 49C. This contributes to preventing inward overhanging of the second interphase insulator 35 in the radial direction of the stator core 22.

(3) The ultrasonic thermal welding is a simple way to couple the first and second interphase insulators 34 and 35.

(4) The second interphase insulative sheet 39 includes the second interphase insulators 33 and 35, which are connected by the bridges 38. With the second interphase insulative sheet 39, the inserter may become caught by the second interphase insulator 35, which is arranged at the second axial end of the stator core 22 that is opposite to the end from which the windings 25U, 25V, and 25W are inserted (first axial end of the stator core 22). This may easily damage the inserter. The connections of the phases including the neutral point N are arranged at the first axial end of the stator core 22. The structure that couples the second interphase insulator 35 and the first interphase insulator 34 at the end opposite to the first axial end is particularly preferable for preventing the inserter from being caught in the second interphase insulator 35.

(5) The thermal welding of the second interphase insulator 35 and the first interphase insulator 34 with the thermal welding device 42 is performed between adjacent coil end 252Uo of the U phase winding 25U and adjacent coil ends 252Vo of the V phase winding 25V in the circumferential direction. As shown in FIG. 5B, a clearance is formed between the adjacent coil ends 252Uo and the adjacent coil ends 252Vo in the circumferential direction. Thus, the first and second interphase insulators 34 and 35 are thermally welded to each other by arranging the ultrasonic horns 45 of the thermal welding device 42 and the ultrasonic welding chips 48 so as to face toward the clearances between the adjacent coils ends 252Uo and the adjacent coil ends 252Vo so as not to be interfered by the coil ends 252U and 252V.

Ultrasonic welding performed by holding the first interphase insulator 34 and the second interphase insulator 35 in the clearance formed between the adjacent coils ends 252Uo and coil ends 252Vo of the first and second phase windings (U phase winding 25U and V phase winding 25V) in the circumferential direction of the stator core 22 is preferable when automating the coupling of the interphase insulative sheets 37 and 39.

It should be apparent to those skilled in the art that the present invention may be embodied in many other specific forms without departing from the spirit or scope of the invention. Particularly, it should be understood that the present invention may be embodied in the following forms.

The first interphase insulator and second interphase insulator may be coupled at the first end of the stator core 22, which is the side from which the inserter is inserted. The first and second interphase insulators may be coupled to each other at any position located between adjacent coils ends of the second phase winding.

Thermal welding other than ultrasonic welding may be performed to thermally weld the first interphase insulator and the second interphase insulator.

The first interphase insulator and second interphase insulator may be coupled to each other by an adhesive agent.

The first interphase insulator and second interphase insulator may be manually coupled to each other.

The present invention may be applied to an interphase insulative sheet that does not include bridges.

The present invention may be applied to an electric compressor other than a scroll type compressor. For example, the present invention may be applied to a piston type compressor.

In the embodiment described above, the first phase winding is the U phase winding, the second phase winding is the V phase winding, and the third phase winding is the W phase winding. However, the windings corresponding to the first to third phase windings may be windings for other phases.

The present examples and embodiments are to be considered as illustrative and not restrictive, and the invention is not to be limited to the details given herein, but may be modified within the scope and equivalence of the appended claims.

What is claimed is:

1. An interphase insulative structure for a motor, the motor including:
    an annular stator core having a first end and a second end in an axial direction;
    a plurality of teeth arranged along an inner circumference of the stator core, with slots being formed between adjacent ones of the teeth in the circumferential direction; and
    first, second, and third phase windings that are extended through the slots and wave wound to the stator core, each of the phase windings having a plurality of coil end conductive portions, which project outward from the slots at each of the first and second ends of the stator core, and a plurality of slot conductive portions, which are arranged in the slots, with the coil end conductive portions and the slot conductive portions being alternately arranged and connected to one another, and the coil end conductive portions for each phase forming a coil end at each of the first and second ends of the stator core;
    the interphase insulative structure comprising:
    an annular sheet-shaped first interphase insulator arranged at each of the first end and second end of the stator core between the coil ends of the first phase winding and the coil ends of the second phase winding to insulate the coil ends of the first phase winding and the coil ends of the second phase winding from each other; and
    an annular sheet-shaped second interphase insulator arranged at each of the first end and second end of the stator core between the coil ends of the second phase winding and the coil ends of the third phase winding to insulate the coil ends of the second phase winding and the coil ends of the third phase winding from each other;
    wherein the first interphase insulator and the second interphase insulator are coupled to each other between adjacent ones of the coil end conductive portions of the second phase winding at least at the second end of the stator core.

2. The interphase insulative structure according to claim 1, wherein the first interphase insulator and the second interphase insulator are coupled to each other at between the coil end conductive portion of the first phase winding and the coil end conductive portion of the second phase winding, which is adjacent to and does not overlap the coil end conductive portion of the first phase winding in the circumferential direction of the stator core.

3. The interphase insulative structure according to claim 1, wherein the first interphase insulator has an inner edge and a coupling region spaced apart from each other in the axial direction of the stator core by a first distance, and the second interphase insulator has an inner edge and a coupling region spaced apart from each other in the axial direction of the stator core by a second distance that is greater than the first distance.

4. The interphase insulative structure according to claim 1, wherein the first interphase insulator and the second interphase insulator are coupled to each other by performing thermal welding.

5. The interphase insulative structure according to claim 4, wherein the thermal welding is ultrasonic welding.

6. The interphase insulative structure according to claim 1, wherein the slots include first and second slots, the first interphase insulators arranged at the first and second ends of the stator core are connected by a bridge inserted into the first slots, and the second interphase insulators arranged at the first and second ends of the stator core are connected by a bridge inserted into the second slots;

the first phase winding, the second phase winding, and the third phase winding are connected at a neutral point arranged at the first end of the stator core.

* * * * *